(12) United States Patent
Shepherd

(10) Patent No.: X8699
(45) Date of Patent: Mar. 18, 1835

(54) PAINT, COMPOSITION,METALLIC OXIDE FOR WHITE

(76) Inventor: Forrest Shepherd

Forrest Shepherd of Fredericksburg Virginia

<u>Letters Patent</u>

The Schedule referred to in these Letters Patent and making part of the same, containing a description in the words of the said Forrest Shepherd himself of his improvement in a metallic oxide or composition to be used as a white paint.

To all to whom these Presents shall come; Be it Known that I Forrest Shepherd of Fredericksburg, Spottsylvania County, State of Virginia have invented a new and useful composition to be used as a white paint, and that the following is an exact description thereof.

The metallic oxide of Barium commonly known in mineralogy as the Sulphate of Barytes, or Barytes, is finely pulverized and mixed with oil and as such is used as a paint either without or mixed with [illegible]te lead.

What I claim as my own Invention in the above composition, the reducing, mixing, and using the said composition either as a substitute for white lead or as an improved white paint, being mixed with white lead.

This oxide of Baryte as used above is in its natural ~~State~~ combination with Sulphuric acid and water free from any poisonous effects upon the painter. It is not acted on by alkalies or acids. it is insoluble in water and endures extreme heat and the effects of the atmosphere without change. It gives a beautiful and durable white like enamel, and as such is recommended to the Public as a new and valuable white Paint In testimony that the above is a full and exact description of my discovery and composition, and the mode of applying it as above specified and described I hereunto set my hand this sixth day of March 1835.

Witnesses
C. H. W. Wharton }
Henry Stone }

Forrest Shepherd.

(Patented 18th March 1835)